United States Patent [19]
Stensel et al.

[11] Patent Number: 5,985,649
[45] Date of Patent: Nov. 16, 1999

[54] DEVICE AND METHOD FOR REMOVAL OF GAS CONTAMINATES THROUGH A SHALLOW SPARGED BIOREACTOR

[75] Inventors: H. David Stensel, 8521 E. Mercer Way, Mercer Island, Wash. 98040; Angela R. Bielefeldt, Boulder, Colo.

[73] Assignee: H. David Stensel, Mercer Island, Wash.

[21] Appl. No.: 08/848,510

[22] Filed: Apr. 28, 1997

[51] Int. Cl.$^6$ ...................................................... A61L 9/01
[52] U.S. Cl. .................... 435/266; 435/295.2; 435/296.1
[58] Field of Search ................................. 435/262.5, 266, 435/295.1, 295.2, 296.1

[56] References Cited

U.S. PATENT DOCUMENTS 5,080,793  1/1992  Urlings ..................................... 210/603
5,279,963  1/1994  Hobby ...................................... 435/266

OTHER PUBLICATIONS

Takahashi, Masahiro and Ando, Shigeru "Odor Control in Municipal Wastewater Treatment Plant", *Tenth United States/Japan Conference on Sewage Treatment and North Atlantic Treaty Organization/Committee on the Challenges of Modern Society Conference on Sewage Treatment Technology*, vol. 1. Part A. Japanese Papers Jul. 1986: pp. 127,133, 137, 140–143, 146, 148, 150–151.

Lutz, Michael P., Davidson, Steve J., and Stowe, Dennis W. "Making Less Scents Good Reason", *Water Environment & Technology* Jun. 1995: pp. 53–57.

"The Matrix Biofilter/Innovative Clean Air Technology", *Matrix Environmental Technologies* Ensley, B.D. and Kurisko, P.R. "A Gas Lift Bioreactor for Removal of Contaminants From The Vapor Phase", *Applied and Environmental Microbiology* Jan. 1994, pp. 285–290.

Landa, Andrew S., Sipkema, E. Marijn, Weijma, Jan, Beenackers, Antonie A.C.M., Dolfing, Jan, and Janssen, Dick B. "Cometabolic Degradation of Trichlorethylene by *Pseudomanas cepacia* G4 in a Chemostat with Toluene as the Primary Substrate", *Applied and Environmental Microbiology* Sep. 1994, pp. 3368–3374.

Pouliot, Yvan, "Combined Scrubber Bed/Biofilter For The Removal Of Volatile Organic Compounds From Contaminated Soil" (report obtained through Internet: http://echs.ida.org/s13/reportintrm06.html on Oct. 29, 1996) 2pp.

"Our Mission" *World Envirotech Services and Technologies, Incorporated* (2 pp.).

"Gete Technology Discussion/Biocube Biofilter" (report obtained through Internet: http://www.gnet.org/gn . . . Techdb/GETE/bbdisc.htm on Oct. 29, 1996) 1 p.

"Biofiltration/Industrial Waste Gas Purification By Means of Micro–Organisms/Removal And Degradation Of Odors, Hydrocarbons, And Acid–Forming Components" *BIOTON/Clairtech b.v.*

Pomeroy, Richard D., "Biological Treatment Of Odorous Air" *Journal WPCF*, vol. 54, No. 12 Dec. 1982: pp. 1541–1545.

Dawson, David S., "Biological Treatment of Gaseous Emissions" *Water Environment Research*, vol. 65, No. 4 Jun. 1993.

Ostojic, Ned, Les, Albin P., and Forbes, Robert "Process Evaluation/Activated Sludge Treatment For Odor Control", *BioCycle* Apr. 1992: pp. 74–78.

(List continued on next page.)

*Primary Examiner*—David A. Redding
*Attorney, Agent, or Firm*—Roy, Kiesel & Tucker

[57] ABSTRACT

A method and apparatus for removing select gas contaminants is disclosed. The apparatus is a bioreactor having a chamber for containing liquid and a liquid positioned therein, the liquid forming a column having a top and a bottom surface defining a height. The bioreactor further has a gas dispersal unit positioned in the column and a selected biomass suspended in the liquid, where the biomass is selected to metabolize the gas contaminant requiring degradation. The method includes feeding a select gas contaminant having a low Henry's coefficient into the gas dispersal unit to produce a stream of bubbles containing the gas contaminants, where the gas contaminant is a food source for said biomass, and allowing the stream of bubbles to sparge through and exit the top of said column.

20 Claims, 1 Drawing Sheet

OTHER PUBLICATIONS

"Gas/Vapor–Phase Biofilters" (Fact Sheets) *Idaho National Engineering Laboratory* (report obtained through Internet: http://www.inel.gov/te . . . /fact–htm/fact266.html on Oct. 29, 1996) 2 pp.

Romain,Michael "Biotreatment of Odor–Containing Gases from Municipal Wastewater Treatment Plants" (A thesis submitted in partial fulfillment of the requirements for the degree of Master of Science in Engineering, University of Washington, Oct. 1996).

Bielefeldt, Angela R. "Biotreatment of Contaminated Gases in a Sparged Suspended–Growth Reactor: Mass Transfer and Biodegradation Model" (A dissertation submitted in partial fulfillment of the requirements for the degree of Doctor of Philosophy, University of Washington, Aug. 1996).

DEVICE AND METHOD FOR REMOVAL OF GAS CONTAMINATES THROUGH A SHALLOW SPARGED BIOREACTOR

BACKGROUND OF THE INVENTION

1. Field of Invention

The invention relates to removal of gas contaminants, and more particularly, to removal of gas contaminants by sparging the contaminated gas through a fluid filled container having biomass suspended therein, where the gas contaminants have a low Henry's coefficient.

2. Prior Art

Removal of gas contaminants generated by industrial processes, treatment of contaminated soils, wastewater treatment plants or other sources of gas contaminants has been made desirable with the increased awareness for environmental integrity, and in some cases, made mandatory by law, particularly more stringent clean air requirements. Various methods have been developed for treatment of contaminated gas streams, such as filtering through activated carbon (adsorption processes), absorption methods, catalytic destruction, thermal destruction (incineration), vapor phase oxidation methods, and biological metabolic or cometabolic methods.

Biological metabolic/cometabolic methods include packed bed biofilters, bioscrubbers, and biotrickling filters. Both biofilters and biotrickling filters are not submerged reactors and contain a significant volume void of liquids or solids. Biofilters treat contaminated gases by moving the gas stream through generally stationary biomass where biological metabolic processes convert the contaminants into less toxic or harmful substances (such as compost filtering). Bioscrubbers generally have biomass suspended in a mobile liquid phase (the solution), the solution is then sprayed into the moving gas stream. Liquid droplets of solution contact the gas contaminants, providing a surface area across which transfer of the gas contaminants into the liquid phase occurs. Bioscrubbers require circulation of both the gas stream and the solution. Biotrickling filters contain inert packing material to which the biomass attaches. Liquid, containing nutrients and buffers, is circulated through the packing material, and contaminated gases are mixed with the circulating fluid. The biomass is considered stationary. Flowing contaminated gases through fluids, primarily through wastewater treatment plant treatment aeration basins containing activated sludge, has also been tried using small gas diffuser. While found to be effective for certain compounds, the depths of these basins, generally 15 feet, make stand alone bioreactors expensive. Additionally, with insufficient oxygen diffusion into the basin near the gas contaminant, such a process is inefficient. Finally, treatment basins have a variety of available food sources for microorganisms, making it difficult to utilize a treatment basin bioreactor to efficiently remove compounds which are more difficult to metabolize than other compounds present in wastewater. The wide variety of food sources available in such a system will generally result in a biomass that will metabolize certain contaminants preferentially over other contaminants. This variance in metabolic rates of differing compounds can result in inefficient or insufficient metabolism of the gas contaminant.

All of these methods present difficulties. Biofilters can have an excessively large "footprint", the media decays and must be refreshed, and it is difficult to provide nutrient supplements to the growing stationary biomass. Bioscrubbers, require two pumps and generally has higher operating and maintenance cost than biofilter, due in part to the increased mechanical complexity of the system. Further, bioscrubbers provide low surface area for mass transfer of the contaminants. Biotrickling filters and biofilters can have media plugging problems due to excess biogrowth and gas short circulating problems, creating uncertainty in the performance reliability of these devices.

SUMMARY OF THE INVENTION

A bioreactor having a chamber, with a liquid positioned therein. Suspended in the liquid is a biomass selected to metabolize certain gas contaminants. Positioned in the bottom of the container is a gas dispersal unit through which gas contaminants are introduced into the chamber as a bubble stream.

OBJECTS OF THE INVENTION

It is an object of the present invention to provide a device for biotreatment of gas contaminants having a small footprint.

It is another object of the present invention to provide a device for biotreatment of gas contaminants which is less complex, more reliable, and more efficient to operate than most other biotreatment methods.

DETAILED DESCRIPTION OF THE INVENTION

Figure 1:
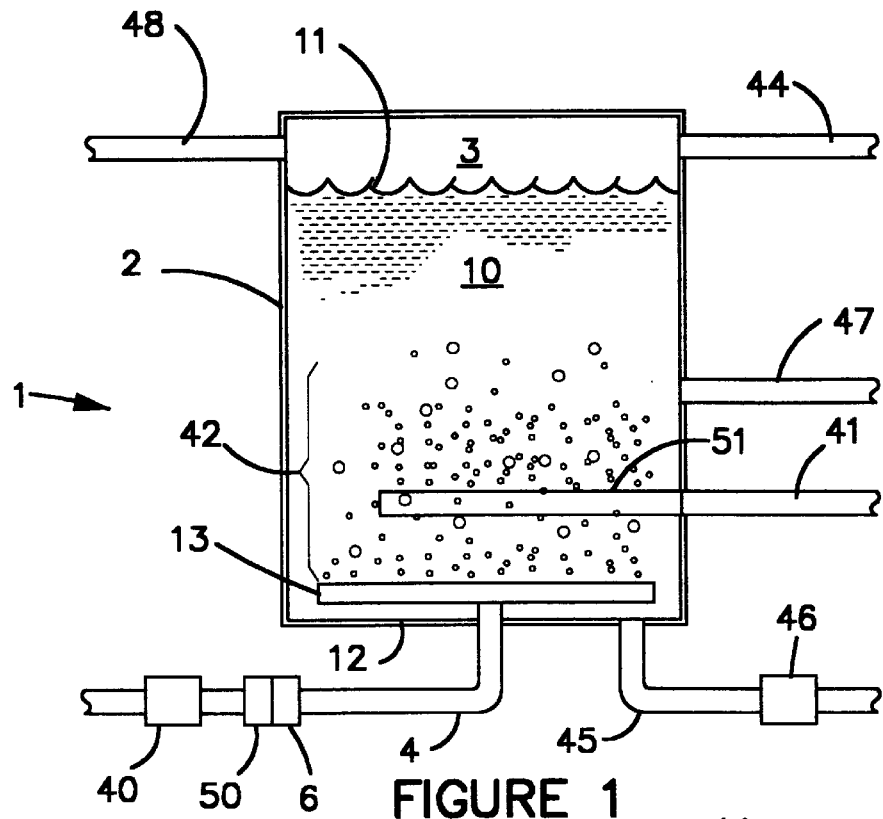
FIG. 1 shows a schematic of the bioreactor of the present invention.

A schematic diagram of the invention is shown in FIG. 1. The device is a bioreactor 1, generally an enclosed chamber 2, defining an interior 3. The bioreactor has a top portion and a bottom portion. While it is not necessary for bioreactor 1 to have an enclosed top, it is preferred. Bioreactor 1 should be constructed of inert materials. Positioned in the interior 3 is a liquid 10 capable of supporting a selected biomass. Generally, liquid 10 will be water, and have nutrients and a pH buffer added to support the biomass to be placed in the liquid 10. Liquid 10 has a top surface 11 and a bottom surface 12, defining a column height. Bottom surface 12 will generally be defined by the bottom of chamber 2. As will be later discussed, bioreactor liquid column height may be about 0.5–10 feet. A gas infeed line 4 is connected to the chamber 2. Contaminated gas is fed through gas infeed line 4 by action of pump 6; pump 6 may be a conventional blower, compressor, etc. Infeed line 4 may be connected to mixing controls 50 to control the rate of flow through infeed line 4, or to control the rate of mixing of contaminated gas with air or oxygen. Prior to feeding gas into the bioreactor 1, the gas may be passed through a filter 40, to remove particulate matter. The filter 40 is shown positioned in infeed line 4 before pump 6, such a placement is not necessary. Contaminated gas may be mixed with air to provide an oxygen source to support biological metabolism in the liquid. Alternatively, an oxygen source, or oxygen supplement, may be provided through oxygen line 41. If a separate oxygen or air line 41 is provided, that oxygen line 41 may be connected to gas dispersal unit 13, described below, or may be connected to a second gas dispersal unit 51.

Located within liquid 10 in bioreactor 1 is a gas dispersal unit 13, such as a gas diffuser device such as Sanitaire ceramic fine bubble diffusers from Water Pollution Control Corp., 9333 N. 49th Street, Brown Deer, Wis. 53223. Gas dispersal unit 13 device breaks gas stream into a plurality of bubbles 42, providing a greater surface area for mass transfer of gas contaminants into the liquid media. Smaller bubbles are preferred, with average bubble diameter 1–2 mm being suitable. The bubbles 42 sparge or rise through the liquid, and the process of rising provides a mixing action to the liquid within the chamber, indicated by the arrows within the liquid 10. Preferably, gas dispersal unit 13 is located on or near the bottom of bioreactor 1 and covering a sufficient surface area to maximize gas/liquid mass transfer, such as covering 80 percent of the reactor bottom or floor. Alternatively, the gas dispersal units 13 could be placed in layers within the system, and splitting the incoming contaminated gas feed among the layered dispersal units. Layered dispersal units 13 are not preferred, as there is a danger that the bubbles produced from the first unit will combine with bubbles from the second stream and coalesce, resulting in larger bubble diameters than desired.

Figure 2:
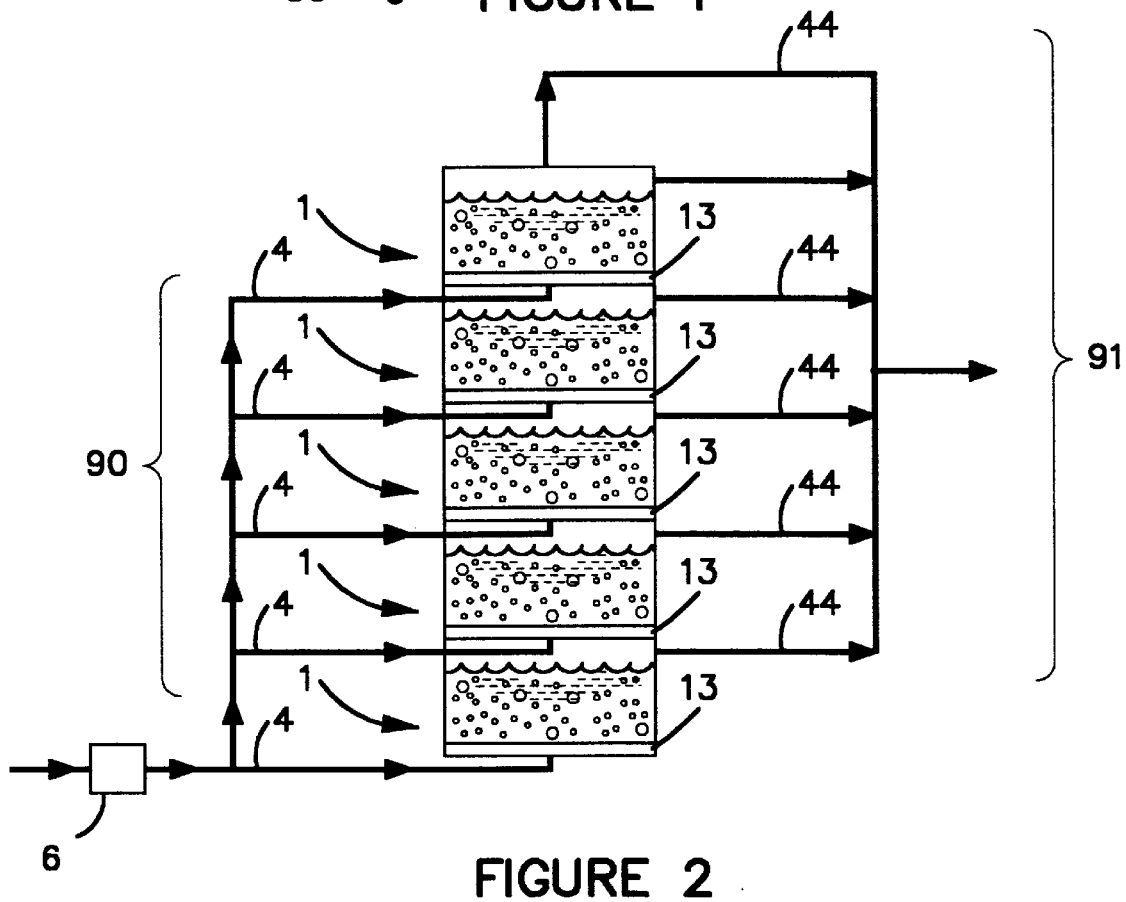
FIG. 2 shows a schematic of the bioreactor of the present invention in a stacked configuration.

An alternative arrangement is shown in FIG. 2, where several bioreactors 1 are stacked into a vertical column. Stacking bioreactors 1 enables the overall floor footprint of the design to remain small. As will be later shown, the reactor depth may be only 3 feet tall, making stacking of multiple units feasible. Shown in FIG. 2 are stacked bioreactors 1 all of which are fluidly connected to a single infeed manifold 90 utilizing a common pump 6 from which separate infeed lines 4 extend into the gas dispersal unit 13 located in each reactor. While use of a common infeed manifold and common pump 6 is not required, use of common components reduces the cost of the system. Additionally shown in FIG. 2 is a common collection system 91, consisting of the exit lines 44 from each bioreactor collected into a single manifold. Separate pumps 6 could be utilized in conjunction with separate infeed lines 4, thus keeping each bioreactor fluidly isolated from the others. This arrangement could be utilized when different contaminated gas streams, for instance, waste gas streams taken from different product lines in a chemical plant, are more effectively biologically degraded in separate reactors.

Use of stacked reactors is preferred to increasing liquid column height in a given reactor. As will be shown later, for a properly engineered bioreactor, increasing liquid column height in that reactor will generally not change the efficiency of the bioreactor. However, increasing liquid column height in a given reactor adversely effects the pump 6 required to produce the desired gas flow rates into gas dispersal unit feed. With an increased liquid column height in the reactor, pump 6 must be sized to account for the increased ambient liquid pressure at the position of the gas dispersal unit.

Flow rates to the dispersal unit should be sufficient to provide an adequate amount of mixing action from the rising bubbles, but not so great that the small bubbles coalesce into larger bubbles. By using the rising gas stream to mix or agitate the liquid column, separate agitation devices can be avoided. A flow rate of 0.2 to 8 SCFM/ft**2 has been found effective for this purpose when using a diffuser unit, such as the Sanitaire unit mentioned above.

At near top of bioreactor is exit line 44. Exit line 44 is for removal of gases after passing through liquid, or removal of gases created by biological degradation of gas contaminants. Exit line 44 may be leaving the top of bioreactor open to the atmosphere, or exit line 44 may be connected to a second pump for pumping exiting gases to another location, such as another bioreactor, or a carbon adsorption reactor for effluent polishing.

The reactor 1 also has a waste line 45 for removal of liquid from within the chamber; associated with waste line 45 are controls 46 for controlling the flow through waste line 45. Also connected to the chamber are liquid line 47 and nutrient line 48. Liquid line 47 supplies liquids (without biomass) to replace fluids lost during wasting. Nutrient line 48 is provided to supply supplemental nutrients or a food source (for cometabolic processes) or pH buffering compounds into liquid 10.

Contaminants

Contaminated gas may contain a multitude of gas contaminants for removal, such as benzene, toluene, ethylbenzene, xylenes, hydrogen sulfide, mercaptans, indole, skatole, amides, ammonia, trichloroethylene, or any other contaminant having a low Henry's coefficient, as discussed below, for which suitable microorganisms exists for metabolic or other biodegradation of that contaminant. If the gas contains a number of undesired contaminants, it may be possible to have a number of suitable microorganisms co-existing within bioreactor. If co-existence of suitable micro-organisms is not possible, bioreactors may be connected in series, where the output gases of reactor one is the input gases of reactor two. In this fashion, the series of reactors may be tailored for optimum removal of contaminants.

The gas to be fed from into the reactor may come from a variety of sources; gas from the head spaces of a wastewater treatment plant requiring "deodorizing"; gas vented from an industrial process or manufacturing requiring removal of contaminants, gasses collected from contaminated soils, etc.

Biomass

Choice of suitable biomass is dependent upon the contaminant to be removed, and is left to those skilled in the art. However, for removal of many common contaminants, particularly odor causing contaminants, such as hydrogen sulfides, mercaptans, amides, etc, suitable biomass, primarily micro-organisms, such as bacteria, can be found in soil, surface or ground waters, or in activated sludge such as produced by wastewater treatment plants, either municipal or industrial. For purposes of this application, activated sludge means a biomass taken from a wastewater treatment plant, and may include other solid matter mixed with the biomass. A seed amount of collected or grown biomass can be placed in the liquid of bioreactor, and those bacteria suitable for biodegradation of the gas contaminant will thrive and grow (acclimate), while those incapable of biodegradation of the gas contaminant will die, due to lack of a food source. For some contaminants, the biomass may have to become acclimatized to the gas contaminant in order to have a sufficient population of microorganism to degrade that contaminant in the efficiencies targeted, such as 98% degradation. Alternatively, suitable biomass may be genetically engineered, or cultured from sources other than activated sludge.

Supplemental nutrients may be provided to biomass, as all elements needed for metabolic action may not be present in the gas contaminant, such as phosphorous and nitrogen, (necessitating the addition of, for instance, $K_2HPO_4$ or $NaNO_3$), trace elements or minerals, or elements present but in a form nonusable by the biomass (such as elemental nitrogen present in air, as $N_2$). Additionally, the pH of the solution may be monitored to maintain optimum growth conditions for the biomass. Buffers may additionally be added, such as sodium bicarbonate for this purpose. Growth of the biomass can be controlled by controlling the supply of oxygen, gas contaminants, supplemental nutrients, and/or operating environment, such as temperature, pH, etc. Additionally, the amount of biomass present in the system, as represented by Solids Retention Times (SRT) may also be controlled.

SRT represents the average length of time solids, including the biomass, remaining in the system (generally, (mass in system/mass removed per unit time) where "per unit time", generally, is days). SRT may be controlled by removal of liquid in the bioreactor (including the biomass associated with the liquid removed), and replacement of the same quantity with liquid having no biomass present. Bioreactor may have a drain for removal of a portion of the liquid present in the system, and an infill line for providing fresh media. Thus, the system can be tailored for optimum characteristics of the contaminant to be degraded. Control of SRT is necessary to efficiently utilize the oxygen in the system; oxygen may be present in the reactor either because oxygen is present in the gas contaminant stream (for instance, a stream collected from a process exposed to air), separately mixed with the inlet gas contaminant, or separately input though a separate line, or a combination of the above. SRT is generally controlled by removing or "wasting" of a portion of the liquid and the biomass suspended in that portion, replacing the removed liquid/biomass with liquid without biomass, thereby maintaining the overall liquid volume of the reactor, but reducing the biomass in that volume.

If SRT becomes too large, the biomass is growing and consuming available oxygen, and may grow to where there is insufficient oxygen in the reactor to support the entire biomass. When this happens, the system is oxygen limited, that is, the biomass will not be able to further grow in response to increasing contaminant levels. In response to insufficient oxygen, the operator may either dilute incoming contaminants, by mixing with additional air, or providing a secondary source of air or oxygen.

The bioreactor may also be designed to degrade the gas contaminants through cometabolic processes. In this instance, the reactor requires the addition of a food source.

System Equations

The overall mass transfer of gas contaminants into the liquid phase has two primary components: (1) mass transfer of the gas into the liquid phase, dependent in part on solubilities and concentrations present in the two phases; and (2) the uptake of the contaminant in the liquid phase by biodegradation, resulting in reduction of concentration in the liquid phase and growth of biomass. Mass transfer for fine bubble dispersion can be estimated from the following equation (under steady state conditions of inlet concentration, gas flow rates and biomass is constant):

$$Cgo = Cgi^*(\exp(-[(D^*Kla)/(Qga^*H)]) + [H^*Cl^*(1-\exp(-[(D^*Kla)/(Qga^*H)]))$$ EQ. 1 term 1(mass transfer term) term 2 (biodegradation term)
Where
  Cgo=concentration of contaminant in gas exiting system (mg/L)
  Cgi=concentration of contaminant in inlet gas (mg/L)
  D=Bioreactor depth (cm)
  Kla=overall mass transfer rate, (min**−1)
  H=Henry's equilibrium partitioning coefficient (L liq/L gas)
  Cl=Concentration of contaminant in liquid (mg/L)
  Qga=gas flow rate into bioreactor per unit cross-sectional area (mL/min/cm**2)

This equation is derived using the two film model of mass transfer and observing that mass transferred into liquid is equal to that mass transferred out of the gas.

As can be seen from an examination of term 1, efficiency of removal of contaminants increases with increasing depth of reactor and decreasing Henry's coefficient. Therefore, substances with smaller Henry's coefficients are more readily removed than substances with higher constants. Substances with Henry's coefficients greater than one results in decreased removal efficiency.

As can be seen from an examination of term 1 and term 2, if term 1 is small, the exponential term is small, resulting in the (1-exponential) in term 2 approaching one. Consequently, term 2 is limited by (Henry's coefficient*Concentration in Liquid). Therefore, if Concentration in Liquid can be made small biokinetically, term 2 will have minimal impact upon the concentration of gas contaminant exiting the system.

The equation governing uptake of contaminant by biomass is estimated as follows, (under steady state conditions of inlet concentration, gas flow rates and biomass is constant):

$$Cl = Ks^*(1 + kd^*SRT)/(SRT^*(Y^*K - kd) - 1)$$ EQ. 2 where
  Cl=Concentration of contaminant in liquid (mg/L)
  Ks=half saturation concentration of contaminant(mg/L)
  kd=endogenous cell decay rate (min−1)
  SRT=Solids Retention Time (min)
  Y=Cell Yield (mg VSS/mg VOC)
  K=maximum specific biodegradation rate of VOC (mg VOC/mg VSS min)

(generally, VOC is used to indicate the gas contaminant to be biodegraded, and is more general than the normally understood meaning of VOC as volatile organic compound. For instance, the bioreactor may be used to degrade ammonia type compounds or hydrogen sulfide, compounds not considered to be volatile organic compound; VSS=volatile suspended solids, which is a dry mass measurement of biomass).

This equation is derived assuming the biokinetics follows Michaelis-Menten kinetics, and assumes that the contaminant is the growth substrate for the biomass.

For a given contaminant and concentration thereof, control over Cl depends upon choice of microorganism and choice of SRT. For "large" SRT, (for instance, in days), Cl, calculated according to EQ. 2, approaches an asymptotic value. Consequently, Cl can be biokinetically limited by proper choice of microorganism and a "large" SRT; the start of an acceptable range for SRT is where a ten percentage increase in SRT results in less than or equal to a five percentage decrease in Cl. SRT's in the range of 0.5–20 days may be sufficient to reduce the impact of term 2 of equation 1. It is to be understood that if more than one type of microorganism is present, choice of SRT may require consideration of an average for each microorganism, or use of the longest SRT from those values calculated for each separate microorganism.

In general, with a large enough biomass, (how "large" depends upon the bioactivity of the chosen microorganisms), the contaminants entering the liquid phase are removed as soon as the contaminants enter the liquid phase, and thus, the efficiency of the reactor will be limited only by the mass transfer rate of the contaminant from the gas to liquid state. If the infeed of contaminants exceeds the ability to biologically degrade same, then the reactor's efficiencies will be biologically limited—contaminant will build up in the liquid and effluent gases of contaminants will reach unacceptable levels.

For multiple contaminants, one contaminant may act as an inhibitor on the uptake of the other contaminant, for instance, where several contaminants are metabolized by the same microorganism, or where one contaminant adversely affects metabolic times of a second contaminant. Where two contaminants are metabolized by same microorganism with similar biokinetics for metabolism, we anticipate degradation of an individual contaminant to be proportional to its concentration fraction in the competing contaminants.

One method for predicting inhibition effect for multiple compound substances is estimated by:

$$\text{Rate Degradation of } A = K^* \text{Conc } A^* X/Ks^*(1+(\text{conc } b/Ks\ B)+(\text{conc } c/Ks\ c)+ \ldots +\text{Conc } A)$$

X=biomass concentration mg/VSS/L
K=Max specific substrate utilization rate of compound A g/g VSS-d
Ks=half saturation concentration for compound A mg/L
Conc A=concentration of championed A mg/L etc.

System Efficiencies

One of the system equations, EQ. 1, is stated with respect to input concentrations (Cgi) and exit concentrations of contaminant(Cgo), generally measured in mg/L. The efficiency percentage of the bioreactor can then be calculated as $100.0^*(1-Cgo/Cgi)$. For a given sized system, e.g. depth and flow rates per unit area, the efficiency of the system will remain substantially constant regardless of changes in the concentration of infeed gas contaminants (assuming the system has acclimated to the newer concentration). For instance, if the efficiency of the system is 98% and the influent concentration is 5 mg/L, then exit concentration of gas contaminant will be about 0.1 mg/L. If the influent concentration is doubled, say to 10 mg/L, the exit rate will also double to 0.2 mg/L. If, however, by increasing the influent concentration the system becomes oxygen limited, as discussed below, the efficiency will decline. System influent concentration of contaminant is anticipated to be less than 20 mg/L.

TESTS

Tests were run on a prototype reactor, consisting of a 40 L, 7.5 inch diameter 56 inch high Plexiglas column. (See Master's Thesis of Michael Romain, Biotreatment of Odor-Containing Gases from Municipal Wastewater Treatment Plants, University of Washington, 1996, herein incorporated by reference). A 7.5 inch diameter ceramic fine bubble diffuser (USA Blue Book) was placed in the bottom of the reactor. A ⅝ inch garden hose was used to bring odorous gases in from a wastewater treatment plant. Gases were fed to a compressor, to maintain flow rates into the diffuser of 27.2 L/min (effective 3.13 cfm/ft2 diffuser). Both acclimated and unacclimated Biomass was tested. One type of biomass used was 5 L of activated sludge mixed with 35 L of secondary effluent from the wastewater treatment plant. Twice per week, 1 L of reactor fluid was wasted and replaced with plant secondary effluent, resulting in a SRT of approximately 123 days. Nitrogen, phosphorous and sodium bicarbonates were added on an as needed basis (pH range of 7.22–8.44) (acclimation was assumed when the biomass, as measured by volatile suspended solids, VSS, reached 250/mg/L). Various test liquid depths were investigated, from 2.0 feet to 4.2 feet. Temperature varied, as the reactor was outdoors (11–17 deg. C.).

Influent gas rates varied between 0.6–5.3, 0.1–1.6, 0.1–0.7, and 0.1-.pp.m. for $H_2S$ ($H=0.385@25$ deg C.), amides, ammonium and mercaptan, respectively. Effluent gases measured beyond detection (0.1 ppm.) for an acclimated sludge. Changing the liquid depth form 4' 2" to 2' 0" did not change the results. Using unacclimated sludge, hydrogen sulfide was successfully removed beyond detection (when influent 4–5 ppm); however, amides (influent 0.35–0.5 ppm), ammonia (0.45–0.6 ppm) and mercaptan (0.4–1.0 ppm), generally saw decreases in concentration, but not beyond detection limits. Generally, acclimated biomasses are more efficient at initial removal of contaminated gases. However, an unacclimated biomass will become more efficient as it acclimates to the contaminants.

Tests were also conducted using a bacterial biomass dominated by a large filamentous bacteria initially cultured from stream water. Several different biomasses were cultured in completely stirred mixed tank reactors (CSTR) with a 5 day SRT using a variety of materials as food sources, such as phenol, and benzene, ethylbenzene, toluene and xylene (BTEX)(benzene $H=0.21@20$ C.; toluene $H=0.23@20$ C.; ethylbenzene $H=0.21@20$ C.; and o-xylene $H=0.18@20$ C.). (See Angela Bielefeldt, Biotreatment of Contaminated Gases in a Sparged Suspended-Growth Reactor: Mass Transfer and Biodegradation Model, PHD Thesis, University of Washington, 1996, incorporated herein by reference). Tests reactors consisted of a 2 L glass cylinder of 7.94 cm diameter (depth of 40.4 cm). Gas was dispersed using a fritted sparge stone (green aquarium type), suspended between 0 and 100 ml from the bottom of the reactor. Gas bubble residence time was about 1.2 sec. Contaminants were fed into the influent airstream by injection of contaminants into the airstream by syringe. Nutrients were added to the biomass as required. To assist mixing in the reactor, a magnetic stir bar was placed in the reactor, and the reactor was placed on a Thermolyne stir plate. Fluids were wasted to maintain a desired SRT.

A series of tests were run with this reactor for removal of BTEX. Varying degrees of removal efficiency were found, from 20% to 99%. Low efficiencies were found for certain biomasses, believed to be due to metabolite accumulation at high loading of contaminants (>20 mg/L-hr). At low loading rates (<20 mg/L-hr), efficiencies were high, typically exceeding 95% for BTEX at all SRT's tested: 1.7 days, 2.7 days and 9.2 days.

For large scale bioreactors, diffusers should be chosen to provide adequate oxygen transfer efficiencies (assuming no supplemental oxygen source will be used in the reactor). Many types are available, such as panel, plate, dome, disc, tube-ceramic, tube plastic or tube membrane.

As indicated above, if the concentration of contaminants in the liquid is kept low by adequate choice of biomass concentration and SRT, then the reactor's efficiency will be limited by mass transfer of the gas contaminants into the liquid phase. This mass transfer will be determined, in part on the Henry's coefficient and mass transfer coefficient of the contaminant, and the depth of the reactor. Depth of the reactor may be estimated from the following equation (assuming biological term in EQ 1 is minimized):

$$\text{Depth} = [-\ln(Cgo/Cgi)*Qga*H]/[VOC\ Kla] \qquad \text{EQ. 3}$$

where

Cgo=concentration of gas contaminants leaving exiting the reactor (mg/L)

Cgi=concentration of gas contaminants entering the system (mg/L)

VOC Kla is the mass transfer coefficient of the contaminant

Depth (cm)

other terms as defined above

This approximation assumes $$VOC\ Kla = O2\ Kla*Dvoc/Do2 \qquad \text{EQ. 3A}$$

where

O2 Kla=oxygen mass transfer coefficient

Dvoc=Diffusivity of the VOC in water (cm**2/sec)

Do2=Diffusivity of oxygen in water (cm**2/sec)

For instance, for compounds with Henry's coefficients of less than 1, and a target efficiency of 90%, depth of tank would be approximately $$2.3*Qga/(VOC\ Kla)$$

Table 1 lists the properties of some of the compounds of interest for biodegradation in the present invention. As used in the table, MW is the molecular weight of the compound, Dw indicates the Diffusivity of the compound in water in units of 10**−5 cm/sec; H indicates Henry's coefficients, VOC Kla was calculated using an O2 Kla of 0.24/min, and Do2 of 2.1*10−5 cm2/sec. As can be seen, the listed compound have a VOC Kla of 0.2/min or less, so using VOC Kla of 0.1/min, the depth of the tank would be approximated by $$23*Qga$$

measured in cm. Thus for a desired reactor height of 10 feet, or approximately 3 meters, flow rates should be under 13.6 mL/min/cm**2. It is believed the VOC Kla of 0.1/min is low for normal operation of the bioreactor. By use of multiple high efficiency gas dispersal units in the reactor, O2 Kla can be increased, thus increasing VOC Kla. It is anticipated that, in general, a VOC Kla of greater than 0.5/min can be achieved. An O2 Lka range of 0.1 to 1.6/min is acceptable. Such a range can be achieved by covering a large percentage of the reactor floor area with densely spaced gas dispersal units.

As can be seen from Eq. 3A, VOC Kla, or the mass transfer coefficient of the contaminant, is dependent upon the $O_2$ Kla; therefore, with a high density of diffusion units in the reactor and with high efficiency diffusion units, $O_2$ Kla and thus VOC Kla's can be made larger. As can be seen from EQ. 3A, with greater VOC Kla's, the depth of the reactor, for a given efficiency, can be made less and maintain the same efficiency. If the depth of the reactor does not change with increasing VOC Kla, the reactor is capable of handling higher volumes of gas contaminants and maintaining the same efficiency levels, that is, Qga may be increased.

Table 1 specifies the Henry's coefficient and mass transfer characteristics of commonly occurring contaminants. For these compounds, removal efficiencies in excess of 90 percent is expected to be achieved in reactors of depths less than 3 meters, with $O_2$ Kla of 0.24/min.

TABLE 1

Common VOCs and Their Physical Characteristics which are Pertinent to Mass Transfer

| Compound | MW | Dw | H | Kla VOC |
|---|---|---|---|---|
| Benzene | 78.1 | 1.3442 | 0.2 | 0.154 |
| Toluene | 92.1 | 1.2378 | 0.23 | 0.141 |
| Ethylbenz | 106.2 | 1.1527 | 0.29 | 0.132 |
| o-Xylene | 106.20 | 1.1527 | 0.18 | 0.132 |
| m-Xylene | 106.20 | 1.1527 | 0.24 | 0.132 |
| p-Xylene | 106.20 | 1.1527 | 0.26 | 0.132 |
| 1,2-Dichlorobenzene | 147.00 | 0.9798 | 0.08 | 0.112 |
| 1,3-Dichlorobenzene | 147.00 | 0.9798 | 0.12 | 0.112 |
| 1,4-Dichlorobenzene | 147.00 | 0.9798 | 0.11 | 0.112 |
| Chlorobenzene | 112.60 | 1.1195 | 0.13 | 0.128 |
| Perchloroethene | 165.80 | 0.9226 | 0.54 | 0.105 |
| Trichloroethene | 131.40 | 1.0363 | 0.35 | 0.118 |
| c-Dichloroethene | 96.90 | 1.2068 | 0.18 | 0.138 |
| t-Dichloroethene | 96.90 | 1.2068 | 0.35 | 0.138 |
| 11-Dichloroethene | 96.90 | 1.2068 | 0.86 | 0.138 |
| Vinyl Chloride | 62.50 | 1.5026 | 0.9 | 0.172 |
| 1,1,2,2-Trichloroethane | 167.90 | 0.9168 | 0.01 | 0.105 |
| 1,1,1-Trichloroethane | 133.40 | 1.0285 | 0.65 | 0.118 |
| 1,1,2-Trichloroethane | 133.40 | 1.0285 | 0.037 | 0.118 |
| 1,1-Dichloroethane | 99.00 | 1.1939 | 0.18 | 0.136 |
| 1,2-Dichloroethane | 99.00 | 1.1939 | 0.04 | 0.136 |
| Chloroethane | 64.90 | 1.4746 | 0.39 | 0.169 |
| Carbon Tetrachloride | 153.80 | 0.9579 | 0.96 | 0.109 |
| Chloroform | 119.40 | 1.0872 | 0.14 | 0.124 |
| Dichloromethane | 84.90 | 1.2893 | 0.09 | 0.147 |
| Chloromethane | 50.50 | 1.6717 | 0.27 | 0.191 |
| 1,2,4-Trimethylbenz | 120.00 | 1.0844 | 0.195 | 0.124 |
| Naphthalene | 130.00 | 1.0419 | 0.019 | 0.119 |
| Bromobenzene | 157.00 | 0.9481 | 0.1 | 0.108 |
| Ethylbromide | 107.00 | 1.1484 | 0.041 | 0.131 |
| Bromo-dicl-methane | 163.80 | 0.9282 | 0.065 | 0.106 |
| Dibromo-cloro-methane | 208.30 | 0.8231 | 0.036 | 0.094 |

We claim:

1. A method of removing select gas contaminants, comprising the steps of (1) providing a bioreactor having a chamber for containing liquid, a liquid positioned in said chamber, said liquid forming a column, said column having a top and a bottom surface defining a height, said bioreactor further having a gas dispersal unit positioned in said column, and a selected biomass suspended in said liquid, said bioreactor further substantially lacking a medium therein upon which said biomass may attach thereto, said biomass selected to metabolize said select gas contaminants, (2) feeding a select gas contaminant, said contaminant having a low Henry's coefficient (measured in (L Liq/ L Gas) at a reference temperature of 20 degrees centigrade) into said gas dispersal unit to produce a stream of bubbles containing said gas contaminant, said gas contaminant being a food source for said biomass;

(3) allowing said stream of bubbles to sparge through and exit said top of said column.

2. The method according to claim 1 wherein said chamber has substantially no other food source for said biomass to metabolize.

3. The method according to claim 2 wherein said Henry's coefficient is in the range of about 1.0 or less.

4. The method according to claim 3 wherein said column height is less than about 10 feet.

5. The method according to claim 3 wherein said column height is less than about 8 feet.

6. The method according to claim 3 wherein said column height is less than about 6 feet.

7. The method according to claim 3 wherein said dispersal unit is positioned near said bottom of said chamber.

8. The method according to claim 3 wherein supplemental nutrients are provided as needed to maintain said biomass, said supplemental nutrients needed by said biomass to metabolize said gas contaminant.

9. The method according to claim 3 wherein said liquid is buffered to maintain the pH within a range suitable for said biomass.

10. The method according to claim 3 wherein said chamber further has a oxygen line connected thereto for supplying oxygen to said liquid in said chamber, and the method includes the further step of supplying oxygen to said liquid as needed to maintain an adequate oxygen source to maintain metabolism by said biomass.

11. The method according to claim 10 wherein said reactor chamber further has a second gas dispersal device fluidly connected to said oxygen line.

12. The method according to claim 3 wherein said stream of bubbles have average diameters of less than 1/8 inch.

13. The method according to claim 3 wherein said gas contaminants are fed into said dispersal unit in the range of 0.2 to 8 SCFM/ft**2.

14. The method according to claim 3 wherein said biomass is derived from activated sludge.

15. The method according to claim 1 further including the step of mixing air containing oxygen with said gas contaminants, said mixing occurring before said step of (3) allowing said stream of bubbles to sparge through and exit said top of said column, said oxygen having an O2 Kla determined in the volume of said liquid above said gas dispersal unit, and said gas dispersal unit being sized so that said O2 Kla is greater than about 0.3/min.

16. The method according to claim 3 wherein said biomass has a solids retention time, and said solids retention time is in the range of about 0.5 days through 30 days.

17. The method according to claim 3 wherein said biomass has a solids retention time, said solids retention time being large enough so a ten percent increase in said SRT results in less than or equal to a five percentage decrease in the concentration of said gas contaminant in said liquid.

18. The method according to claim 3 wherein said liquid in said chamber is water.

19. The method according to claim 3 further including the step of filtering said input stream of gas contaminants, said step of filtering occurring before said step of feeding said contaminant into said dispersal unit creates a stream of bubbles.

20. The method according to claim 3 wherein said chamber has a floor, and wherein said gas dispersal unit is positioned near said floor and covers more than about 60 percent of the area of said floor.

* * * * *